(12) United States Patent
Butters et al.

(10) Patent No.: US 7,425,272 B2
(45) Date of Patent: Sep. 16, 2008

(54) SYSTEMS AND METHODS FOR IN-SITU CLEANING OF PROTECTIVE SLEEVES IN UV DECONTAMINATION SYSTEMS

(75) Inventors: Brian E. Butters, London (CA); Anthony L. Powell, London (CA)

(73) Assignee: Purifics Environmental Technologies, Inc., London, Ontario (CA)

( * ) Notice: Subject to any disclaimer, the term of this patent is extended or adjusted under 35 U.S.C. 154(b) by 361 days.

(21) Appl. No.: 11/089,413

(22) Filed: Mar. 24, 2005

(65) Prior Publication Data

US 2005/0211641 A1    Sep. 29, 2005

Related U.S. Application Data

(60) Provisional application No. 60/556,034, filed on Mar. 24, 2004.

(51) Int. Cl.
   *C02F 1/32* (2006.01)
(52) U.S. Cl. .......... 210/748; 210/760; 250/436
(58) Field of Classification Search ........ 210/748, 210/760; 250/431, 436
   See application file for complete search history.

(56) References Cited

U.S. PATENT DOCUMENTS

| | | | |
|---|---|---|---|
| 4,983,307 A | | 1/1991 | Nesathurai |
| 5,462,674 A | | 10/1995 | Butters |
| 5,589,078 A | | 12/1996 | Butters |
| 5,625,194 A | * | 4/1997 | Stitzel et al. ............ 250/431 |
| 6,136,203 A | | 10/2000 | Butters |
| 6,398,971 B1 | | 6/2002 | Butters |
| 6,447,721 B1 | * | 9/2002 | Horton et al. ............ 422/24 |
| 6,402,964 B1 | | 11/2002 | Schmid |
| 6,773,610 B2 | * | 8/2004 | Korin ............ 210/748 |
| 7,141,222 B2 | * | 11/2006 | Wong ............ 422/186.3 |
| 2003/0052064 A1 | * | 3/2003 | Korin ............ 210/760 |
| 2004/0079708 A1 | | 4/2004 | Butters |
| 2005/0027039 A1 | * | 2/2005 | Sanbayashi et al. ........ 523/210 |

FOREIGN PATENT DOCUMENTS

CA    2414361    5/2001

OTHER PUBLICATIONS

International Search Report for corresponding PCT application PCT/iB2005/000778 mailed Aug. 24, 2005.
Written Opinion of the International Searching Authority for corresponding PCT application PCT/IB2005/000778 mailed Aug. 24, 2005.

* cited by examiner

*Primary Examiner*—Walter D. Griffin
*Assistant Examiner*—Cameron J Allen
(74) *Attorney, Agent, or Firm*—Baker & McKenzie LLP (57) ABSTRACT

Systems and methods for cleaning protective sleeves in UV decontamination systems are disclosed. In one embodiment, a system for decontaminating contaminated media includes a translucent sleeve surrounding a light source, and a housing configured to receive the sleeve. A distance between an outer surface of the sleeve and an inner surface of the housing defines an annulus for flowing a contaminated fluid. The system also includes a pump for flowing the contaminated fluid through the annulus. In addition, the system in such embodiments may include a honing material in the contaminated fluid, where the flowing of the honing material against the outer surface of the sleeve removes debris aggregated on the outer surface of the translucent sleeve.

32 Claims, 4 Drawing Sheets

SYSTEMS AND METHODS FOR IN-SITU CLEANING OF PROTECTIVE SLEEVES IN UV DECONTAMINATION SYSTEMS

CROSS-REFERENCE TO RELATED APPLICATION

This Application claims the benefit of U.S. Provisional Application Ser. No. 60/556,034, filed on Mar. 24, 2004, and entitled "Systems and Methods for In-Situ Cleaning of Protective Sleeves in UV Decontamination Systems," which is commonly assigned with the present application and incorporated herein by reference for all purposes.

TECHNICAL FIELD

Disclosed embodiments herein relate generally to the cleaning of decontamination systems, and more particularly to systems and methods for in-situ cleaning of protective sleeves in ultraviolet decontamination systems.

BACKGROUND

Traditional UV-Oxidation (UV/Ox) systems employ a UV lamp inside of a quartz sleeve installed in an annular reactor. This style of reactor is widely known. The quartz sleeve protects the UV lamp from the wastewater; however, during treatment, the quartz sleeve typically gets fouled with metal and other oxide layers. This coating absorbs the UV light and thus should be cleaned for optimal use.

In the past, various forms of wiper mechanisms have been designed to remove these layers from a quartz sleeve. All such forms of wiper mechanisms act to 'wipe off' the oxide layer from the external surface of the sleeve. Unfortunately, such wiper mechanisms suffer from a number of drawbacks, including the fact that they are typically large complicated devices that require a large annular space between the outside surface of the sleeve housing the UV lamp and the surrounding tubing housing the sleeve in order to accommodate the wiper mechanism. UV/Ox systems rely on the transmissivity of the water in order to allow the UV photons to reach the contaminants in the fluid passing through the annular region between the sleeve and housing. However, as the size of the annular region between the sleeve and tubing surrounding the sleeve increases, the effectiveness of the UV light at the outer edges of the annulus region decreases, which often impacts the efficiency of the system. In addition, conventional wiper mechanisms contain a number of moving parts that are submersed in water, thus raising reliability concerns. Also, such wiping mechanisms can etch the surface of the quartz sleeve during the wiping action, which may result in premature failure of the sleeve. Furthermore, some wiper mechanisms employ acidic solutions in the cleaning process, thus raising corrosion issues.

Prior techniques employed to overcome the need for wipers is provided by the photocatalytic treatment of contaminated media, such as discussed in U.S. Pat. No. 5,462,674, which is commonly assigned with the present disclosure and incorporated herein by reference for all purposes. Specifically, the use of photocatalysts in such a system typically provides a continuous cleaning benefit for the quartz sleeves. However, there are some treatment applications where there is minimal or no benefit to using photocatalysis over a photolysis treatment that occurs in typical treatment systems. Thus, employing a photolytic system over a photocatalytic system is far more cost effective since the need for photocatalyst recovery equipment and the like is not required. One example is the treatment of nitrosodimethylamine (NDMA), which is a contaminant that is destroyed solely by UV light (i.e. 200 nm-270 nm). Utilizing a photocatalytic mode of treatment for NDMA is not optimal since it does not increase destruction efficiency over photolysis, but yet requires additional cost for a catalyst recovery operation.

The same cost benefit analysis may hold true for many other organic or inorganic contaminant that is easily photolyzed. Another example with little or no benefit of operating a photocatalytic system over the typical photolytic process is in UV-disinfection. Once again, it is the UV light energy that performs the work, and thus the addition of a photocatalyst (and additional equipment) does little or nothing for system efficiency, while still adding an additional catalyst recovery operation (and cost) to the process. Unfortunately, however, when switching from a photocatalytic system to a more cost effective photolytic system, the lack of the photocatalyst typically results in a build-up of contaminated and other residue on the outer surface of the quartz sleeves housing the UV lamps used in the photolytic process, thus necessitating the wiper mechanisms discussed above. Accordingly, what are needed in the art are systems and methods for cleaning the sleeves housing the UV lamps in UV decontamination systems that do not suffer from the deficiencies associated with conventional techniques.

BRIEF SUMMARY

Systems and methods for cleaning protective sleeves in UV decontamination systems are disclosed. The cleaning systems and methods disclosed herein provide for applying the benefits of shear stress during a dedicated cleaning process performed on the outer surface of the sleeves. The increased shear stress on these surfaces provides a beneficial cleaning of contaminants that have built up on the outer surface of the sleeve when a selected honing material is added to the fluid flowing in the annulus. The disclosed systems and methods for cleaning the outer surface of a quartz sleeve are based on the recognition that providing a honing material with a predetermined abrasiveness through the annulus at high velocity works to remove aggregated particles from the outer surface. As a result, the disclosed systems and methods provide for the increasing of the flow rate (velocity) of the fluid passing through the annulus when a honing material is added to the fluid, so as to abrasively contact the outer surface of the sleeve in order to remove aggregated contaminants and other particles. Applications for the disclosed systems and methods include replacing the typical sleeve cleaning equipment found in photolytic decontamination systems, as well as the short comings of that cleaning equipment.

In one embodiment, a system for decontaminating contaminated media includes a translucent sleeve surrounding a light source, and a housing configured to receive the sleeve. A distance between an outer surface of the sleeve and an inner surface of the housing defines an annulus for flowing a contaminated fluid. The system also includes a pump for flowing the contaminated fluid through the annulus. In addition, the system in such embodiments may include a honing material in the contaminated fluid, where the flowing of the honing material against the outer surface of the sleeve removes debris aggregated on the outer surface of the translucent sleeve.

In another embodiment, a method for decontaminating contaminated media includes providing a translucent sleeve surrounding a light source, and locating the sleeve within a housing, where a distance between an outer surface of the sleeve and an inner surface of the housing defines an annulus for flowing a contaminated fluid. In such embodiments, the method further includes dispersing a honing material within the contaminated fluid, and flowing the contaminated fluid through the annulus. The flowing of the honing material against the outer surface of the sleeve removes debris aggregated on the outer surface of the translucent sleeve.

BRIEF DESCRIPTION OF THE DRAWINGS

For a more complete understanding of this disclosure, and the advantages of the systems and methods herein, reference is now made to the following descriptions taken in conjunction with the accompanying drawings, in which.

DETAILED DESCRIPTION OF PREFERRED EMBODIMENTS

As used herein, "contaminated fluid" is a fluid that contains undesirable organic, inorganic products, metals, and possibly microbial cells or other microorganisms. Although contaminants are undesirable in the sense that they are usually toxic when ingested or contacted by humans, the term "undesirable" should not be understood to be restricted to such toxic substances. As used herein, the term "decontaminated effluent" means that the undesirable substances in the contaminated fluid have been altered or modified into a desirable or an acceptable substance, again, usually a substance that is non-toxic. Such alteration or modification can result from the oxidation of contaminants, reduction of contaminants, disinfection and/or sterilization of bacteria, or the like. Normally such alteration or modification of any organic substance is achieved by decomposing the substance into byproducts having a smaller molecular weight than the original contaminated fluid. It should be noted that "fluids" and "effluents" should not be read or interpreted as being limited to liquids. Rather, such items also encompasses gases, such as air.

Figure 1:
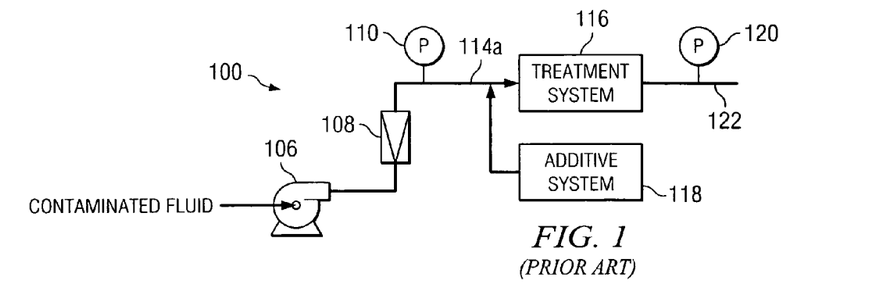
FIG. 1 illustrates a process flow diagram of one embodiment of a continuous photolytic purification system that may provide an environment for the cleaning systems and methods disclosed herein.

Referring initially to FIG. 1, illustrated is a process flow diagram of one embodiment of a continuous photolytic purification system 100 that may provide an environment for the cleaning systems and methods disclosed herein. The illustrated system is operable to decontaminate contaminated fluids and other media using a standard photolytic process. By employing a photolytic system 100 rather than a photocatalytic system, the overall capital costs of the purification system 100 may be substantially reduced, as discussed above.

Contaminated fluid, such as contaminated water, enters the system 100 at a pump 106. Pump 106 pumps the contaminated fluid through a flow meter 108, and then through a pressure gauge 110. Once passing the pressure gauge 110, the contaminated fluid flows to a treatment system 116. Treatment system 116 employs photolytic reactions with the contaminants in the fluid to decontaminate the incoming fluid by destroying contaminants using photolytic reactions. Moreover, additives may be injected into the contaminated fluid from an additive system 118 to assist in the photolytic reactions. Such chemical additives are preferably oxidants, such as ozone and hydrogen peroxide. Such oxidants are photolyzed into hydroxyl radicals, which then oxidize the contaminants during a photolytic process. After undergoing the photolytic reactions, the decontaminated fluid exits the treatment system 116 through an optional pressure gauge 120, and to an outlet 122. It should be understood that the terms "contaminated" and "contaminants" as used herein are not limited to toxic or otherwise dangerous particles or molecules, but rather include any type of molecule or particle, harmful or not, that may be present in the fluid. As such, a "contaminated fluid" is not necessarily a toxic fluid, but instead may simply be a fluid having particles dispersed therein that are different than the particle comprising the fluid itself.

Figure 2:
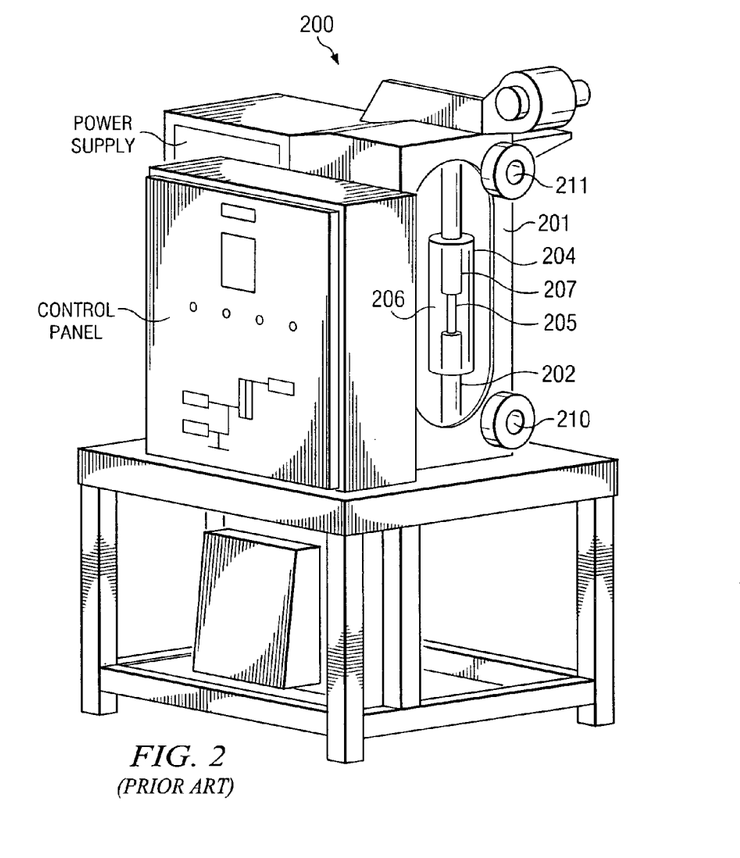
FIG. 2 illustrates a side sectional view of a conventional reactor cell found in typical continuous photolytic purification systems, such the one shown in FIG. 1.

Turning now to FIG. 2, illustrated is a side sectional view of a conventional photolytic purification system 200, such as the system 100 illustrated in FIG. 1. Contaminated water or other fluid is input to the system 200 using an inlet 210, and discharged from the system 200 using an output 211. The illustrated purification system 200 is of the type readily available to the general public, such as the type available from Calgon Oxidation Systems of Pittsburgh, Pa., USA.

The system 200 also includes a photolytic cell 201 having a sleeve 202 that is concentrically disposed within tubing 204, and surrounding a UV lamp 205. The sleeve 202 may be a quartz sleeve, but environments for the cleaning systems and methods disclosed herein are not so limited. The space formed between concentric the sleeve 202 and the tubing 204 is referred to as the annulus. The annulus is denoted by reference numeral 206.

As mentioned above, many conventional cleaning mechanisms for cleaning debris and the like off of the outer surface of the tubing sleeve 202 employ wiping devices (wiper 207) to physically scrape contaminants off of this surface. To employ such wiper 207 mechanisms a large annular space in the annulus 206 in order to accommodate the size of the wiper 207 mechanism is typically required. However, as the size of the annulus 206 increases, the transmissivity of the overall annulus distance decreases, which often impacts the efficiency of the system 200 due to photon degradation across the annulus. Thus, even assuming such wipers are sufficient to clean the outer surface of the sleeve 202, systems that employ UV photons to reach the contaminants in the fluid passing through the annulus 206 typically continue to suffer.

Specifically, such systems 200 rely on the transmissivity of the water occupying the annulus 206, and generally speaking the larger the size of the annulus 206, the less overall transmissivity of the annulus region traversed by the UV photons. As a result, even if users of such systems 200 are satisfied with the cleaning capabilities of the wiper 207 mechanisms, despite their short comings, the UV decontamination efficiency of the system still suffers due to the large annulus 206 required to accommodate the wiper 207 (called "channeling"). The systems and methods disclosed herein, therefore, not only overcome the shortfalls of the wiper mechanisms, but also allow for a significant reduction in the distance in the annulus 206, thus improving the overall operating efficiency of purification systems such as the system 200 shown in FIG. 2.

Figure 3:
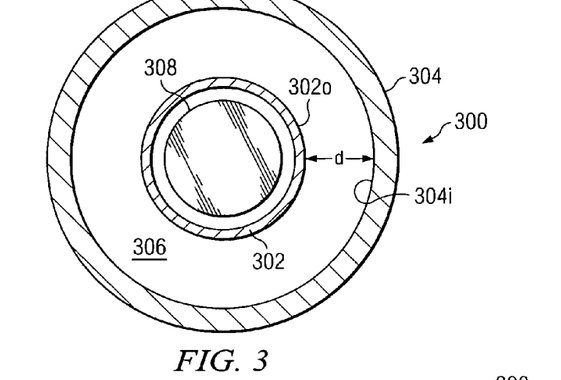
FIG. 3 illustrates a cross-sectional view of one embodiment of a photolytic reactor cell to be cleaned by the cleaning systems and methods disclosed herein.

Looking now at FIG. 3, illustrated is a sectional view of one embodiment of a photolytic reactor cell 300 to be cleaned by the cleaning systems and methods disclosed herein. The photolytic cell 300 includes a sleeve 302 that is concentrically disposed within and housed by tubing 304. The sleeve 302 may be a quartz sleeve, but environments for the cleaning systems and methods disclosed herein are not so limited. The outer surface of sleeve 302 is denoted by reference numeral 302o, whereas tubing 304 has an inner surface denoted by reference numeral 304i. The space formed between concentric surfaces 302o and 304i defines an annulus 306, and has a size defined by a distance marked "d".

Centrally disposed within tubing 304 is light source 308. Light source 308 is preferably a UV lamp, such as a low-pressure mercury UV lamp. Light source 308 is typically configured to emit UV light at a predetermined wavelength for conducting a photolytic decontamination process. Electronic ballasts (not illustrated) are utilized to increase the efficiency, power factor and life of light source 308. The electronic ballasts serve to regulate the current supplied to the lamps. The efficacy of light source 308, when operating on an electronic ballast, is substantially higher compared to the usage of a standard core-coil type ballast. The electronic ballasts may be controlled by programmable logic circuitry (not illustrated).

As mentioned above, many conventional cleaning mechanisms for cleaning debris and the like off of the outer surface 302o of the sleeve 302 employ wiping devices to physically scrape contaminants off of this surface 302o. As such, a large annular space (i.e., a large d) is required in order to accommodate the size of the wiper mechanism. During use of the system, the annular region 300 contains molecules of contaminants passing through in a contaminated fluid. Since the contaminated fluid is not 100% translucent, as the size of the annulus 306 is increased, e.g., to accommodate the wiper mechanism, the overall transmissivity across the entire annulus decreases due to photon degradation as the photons travel away from the UV source 308. As a result, when contaminant particles are displaced away from the UV light source, such contaminant particles have reduced chances of photolytic reactions since the UV flux is significantly reduced within large annulus 306. In contrast, contaminant particles closer to the sleeve 302 have greater photolytic reaction rates because of their proximity to the UV light 308. Thus, greater concentrations of contaminant particles flow through the outer portion of annular region 306.

The systems and methods disclosed herein not only overcome the shortfalls of such wiper mechanisms in photolytic purification systems, but also allow for optimization of the distance (d) defining the annulus 306, thus improving overall system operating efficiency. More specifically, in accordance with the disclosed principles, the size of the annulus 306 is decreased significantly from the typical sizes found in conventional systems having wipers in the annulus regions. For example, the annulus 306 in some embodiments may only be about d=6 mm to 12 mm, which is far smaller than the annulus size needed to provide wiper mechanisms for the sleeves. By providing such smaller annulus 306 sizes, the contaminants in the contaminated fluid are thoroughly mixed when passing by the sleeve 302 and light source 308 such that the concentration of the contaminants are increased br maximized at or near the quartz sleeve thus increasing photolytic rates, while still allowing for sufficient transmissivity for optimal photon utilization.

In conventional annulus designs, the typical large sizes result in a gradient in the photon concentration when moving from the sleeve 302 (closer to the light source 308) to the tubing 304 (distal from the light source 308). Because of this concentration gradient in conventional systems, the concentration of contaminants generally tends to be greater away from the light source 308 since the UV light more easily reaches contaminants near the sleeve 302. The greater concentration of contaminants near the tubing 304 results in reduced photolytic rates since the higher contaminant concentrations are where the UV flux is lowest.

In contrast, by providing a significantly smaller annular size, the contaminated fluid may be continuously mixed when passing by the UV light source 308 across the length of the cell 300. As a result, the concentration of contaminants throughout the contaminated fluid as the fluid passes by the cell 300 is made substantially equal, and contaminant concentrations are maximized at the regions where UV flux is greatest. However, the size of the annulus 306 should also not be made too small, since such a design may result in a large percentage of the photons from the light source 308 being lost by impacting the inner surface 404i of the tubing 404 rather than contaminant particles. Along these lines, the size of the annulus 306 may be optimized to provide a desired amount of such mixing by considering additional factors related to the geometry of the reactor, such as the flow rate of the contaminated fluid, the viscosity of the contaminated fluid, the output of the light source 308, etc. In sum, the size of the annulus 306 is optimized when a sufficient amount of mixing of the contaminants in the contaminated fluid occurs such that there is little or no concentration gradient in the contaminants across the annulus 306. The reactor may therefore photolyze a greater amount of contaminants as the fluid flows past the length of the cell 300, increasing overall reactor efficiency. In addition, the mixing provided by optimizing the size of the annulus 306 also cleans the outer surface 402o of the sleeve 402, obviating the need for wipers, as discussed in greater detail below.

Figure 4:
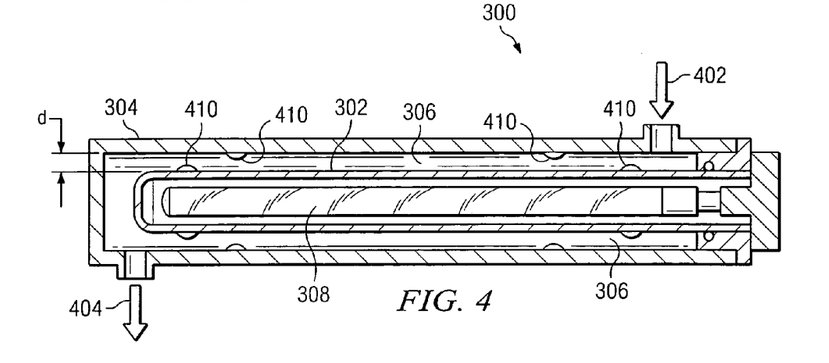
FIG. 4 illustrates a side cross-sectional view of the photolytic cell shown in FIG. 3.

Referring now to FIG. 4, illustrated is a side cross-sectional view of the photolytic cell 300 to be cleaned by the cleaning systems and methods disclosed herein. As shown in FIG. 3, the photolytic cell 300 again includes a housing in the form of tubing 304 surrounding a sleeve 302, which in turn surrounds the light source 308. Tubing 364 is preferably composed of plastic, stainless steel, or another suitable material that is corrosion-resistant, while the sleeve 302 is typically constructed from quartz, as mentioned above. Also shown in FIG. 4 is an inlet 402 through the tubing 304 for receiving contaminated fluids to be decontaminated, as well as an outlet 404 for expelling the fluid.

As described with reference to FIG. 3, conventional photolytic reactor cells possess annuluses that are abundantly wide. As such, typically only those particles of contaminants that travel in close proximity to the UV light source are affected by photolytic reaction, while the particles that do not travel in close proximity to the light source are often not. In accordance with the principles disclosed herein, the size of annulus 306 is optimized so that the concentration of contaminants in the fluid passing through the reactor cell 300 is substantially equal via mixing of fluid. By optimizing the annulus 306 size, the turbulence caused within the reactor cell 300 increases the shear stress provided by the fluid flowing within the annulus 306. The existence of shear stress on the closely spaced surfaces 302o and 304i ensures complete turbulent flow through the annulus 306.

In addition to the benefits of mixing the contaminated fluid discussed above, the cleaning systems and methods disclosed herein also provide for applying the benefits of shear stress on what amounts to a cleaning process performed on the cell 300 during reactor operation. Specifically, the increased shear stress on surfaces 302o and 304i provides a beneficial cleaning of contaminants that have built up on the outer surface 302o of the sleeve 302 when a selected honing material is added to the fluid flowing in the annulus 306. As mentioned above, as contaminants aggregate on the outer surface 302o of the sleeve 302, the likelihood of UV photons passing through the sleeve 302 and into the annulus 306 to decontaminate passing fluid decreases. As a result, the disclosed technique provides for the increasing of the flow rate of the fluid passing through the annulus 306 when a honing material is added to the fluid, so as to abrasively contact the outer surface 302o of the sleeve 302 in order to remove aggregated contaminants and other particles. In an exemplary embodiment, the honing material is a photocatalyst such as $TiO_2$, however, those having ordinary skill in the pertinent field of art will readily be capable of selecting any appropriate honing material.

In sum, the disclosed systems and methods for cleaning the outer surface 302o of a quartz sleeve 302 are based on the recognition that providing a honing material with a predetermined abrasiveness through the smaller annulus 306 of a photolytic cell 300 at high velocity creates a turbulence or agitation in the fluid that works to remove aggregated particles from the outer surface 302o. With these cleaning systems and methods, there is no need for the use of wiper mechanisms to do the cleaning, and thus there are no moving parts used to clean the quartz sleeve 302. As a result, the cost and maintenance of the photolytic system is substantially reduced, while system reliability is greatly enhanced. In addition, by removing the need for wiper mechanisms, sleeve 302 replacement because of wiper etching or sleeve breakage, due to stress of the wiper rubbing against the outer surface 302o, is reduced or eliminated. Of course, less need for sleeve replacement also results in reduced maintenance costs associated with the system.

In another embodiment, the cleaning technique disclosed herein may be employed so as to help center the quartz sleeve 302 in the cell 300, in many cases without increasing the pressure drop of the system. This approach may be employed by forming dimples 410, for example, protruding from the outer surface of the quartz sleeve 302 or protruding from the inner surface of the tubing 304. Alternatively, spacers on one or both of these surfaces may also be employed. By placing such items at predetermined spaces around the circumference of either surface, the sleeve 302 in the cell 300 may be centered in the tubing 304 more consistently, while still allowing highly turbulent flow to pass through the annulus 306 of each cell 300.

Figure 5:
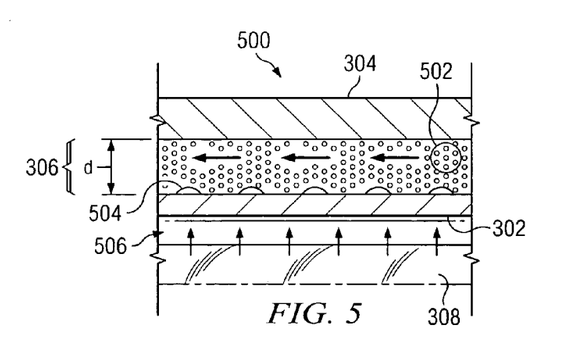
FIG. 5 illustrates a close-up view of a portion of the annulus of the cell illustrated in FIG. 4.

Turning to FIG. 5, illustrated is a close-up view of a portion 500 of the annulus 306 of the cell 300 illustrated in FIG. 4. From this view 500, the sleeve 302 surrounding the light source 308 and the tubing 304 surrounding the sleeve 302 may still be seen. As before, the distance 'd' from the inside surface of the tubing 304 to the outside surface of the sleeve 302 defines the annulus 306. This close-up view illustrates how the honing material 502 removes debris 504 from the outer surface of the sleeve 302, in accordance with the disclosed principles. In such embodiments, the honing material 502 is provided in the agitated or turbulent fluid passing over and around the outside of the quartz sleeves 302. The honing material then scrapes or abrades the debris 504, through shear stress, that may have accumulated on the outer surface of the sleeve 302.

In embodiments illustrated by FIG. 5, the honing material 502 can comprise gas bubbles created in the contaminated fluid flowing through the annulus 306. In such embodiments, an aeration device (not illustrated) may be added to the system upstream of the cell 300 to inject gas bubbles of, for example, oxygen or even regular air into the contaminated fluid to be flowed through the annulus 306. Thus, when the contaminated fluid flows through the annulus 306 at a high flow rate, e.g., 1 meter per second, the bubbles acting as the honing material 502 serve to abrade off accumulated debris 504 by contacting the debris 504. Specifically, it is the change in density, consistency, texture, etc. between the honing material 502 and the remainder of the contaminated fluid, as well as the flow rate, that allows the honing material 502 to remove debris 504 from the outer surface of the sleeve 302. Moreover, the mixing described above to equalize contaminant concentration within the annulus 306, further assists the creation of shear stress against the sleeve 402 to abrade accumulated particles.

In some embodiments, the gas bubbles 502 serving as the honing material 502 may also be photoreactive to the light illuminating from the light source 308. More specifically, if the bubbles 502 contain oxygen, then hydroxyl radicals may be created from the illumination of the light 506 onto the bubbles 502 through a photolytic process. As discussed above, the newly created hydroxyl radicals may then bond to contaminants, including the debris 504 accumulating on the surface of the sleeve 302, to oxidize the debris particles and remove them from the system. In these embodiments, the reduced size of the annulus 306 (far smaller than conventional systems incorporating mechanical wipers) is also beneficial to the oxidizing of debris 504 and contaminants. Specifically, because the size (i.e., the 'd') of the annulus 306 is far smaller, the transmissivity of the passing fluid becomes less of an issue since photons from the light source 308 do not need to travel as far into the annulus 306. Moreover, if the size of the annulus 306 is optimized as discussed above, the contaminated fluid, and thus the contaminants and the honing material 502, may be thoroughly mixed when passing by the sleeve 302, further increasing the shear stress imparted on the debris 502. In short, the smaller annulus 306 allows for increased flow rates because transmissivity becomes less of a concern. The higher flow rate, in turn, helps provide a cleaning feature for the cells in the system.

In another embodiment that may be illustrated in FIG. 5, the honing material 502 employed is the actual product being decontaminated in the reactor. In such embodiments, the honing material 502 is provided in the agitated or turbulent fluid passing over and around the outside of the quartz sleeves 302. The shear stress of the passing honing material then scrapes or abrades the debris 504 that may have accumulated on the outer surface of the sleeve 302. In one exemplary embodiment, the product being oxidized is starch for use, for example, in the manufacture of paper. In this exemplary process, the starch is added to the fluid as the "contaminant" species to be oxidized, and an oxidant is added to the starch, such as hydrogen peroxide, to photolyze into hydroxyl radicals to oxidize the starch. Specifically, as the fluid passes the sleeve 302, the light from the light source 308 hits the hydrogen peroxide particles, which creates hydroxyl radicals in the fluid to oxide the starch (or other product). The hydroxyl radicals then react with starch particles, usually breaking the particles into smaller particles (i.e., thinned). However, in such embodiments, it is the abrasive property of the starch itself that provides the cleaning of the sleeves 302 described herein. In this example, the shear stress of the starch particles passing by the outer surface of the sleeve 302 helps to remove accumulated debris 404, as well as the decontamination provided by the hydroxyl radicals. Thus, in such an embodiment, while the system is primarily employed to oxidize the starch for thinning the starch through oxidation, the starch itself also works as the honing material 502 to keep the sleeve 302 clean when the fluid (and thus the starch dispersed in the fluid) are passed by the sleeve 302 at a high flow rate and agitated.

Another advantage to the disclosed system is the ability to produce ozone. More specifically, in embodiments where microbubbles containing oxygen (e.g., pure oxygen bubbles or bubbles containing oxygen in part) are injected into the passing fluid, light 506 from the light source 308 can generate ozone from the bubbles if illuminating the bubbles at a specific wavelength. For example, if the illuminated light is about 185 nanometers, the oxygen in the bubbles creates ozone when contacted by photons of that wavelength. In a specific embodiment, the light source may even be dichromatic, where the two wavelengths produced are 185 nm and 254 nm. Of course, other wavelengths may also be employed depending on the desired applications.

A significant advantage of such embodiments is that the in situ generation of ozone serves to decontaminate particles in the fluid. Some conventional systems employ an additional ozone generator to inject or create ozone in a contaminated media for illumination, which in turn serves to oxidize and thus decontaminate the media when illuminated with certain wavelengths of light that create hydroxyl radicals. In this embodiment, however, no separate ozone generator is required since the ozone is generated in situ in the system, which then serves to decontaminate the media. As a result, the costs associated with adding and maintaining an ozone generator are eliminated, while the benefits of decontaminating various media with ozone remains. Moreover, this technique of in situ ozone generation is not limited to embodiments where bubbles are present in the passing fluid. Specifically, the illuminating light 506 may also photolyze dissolved oxygen (e.g., oxygen present in the fluid in another form, such in water molecules) to create ozone. In such embodiments, a separate means for aerating the contaminated fluid is not required.

Ozone-generating embodiments are additionally beneficial since additives, such as chlorine, that are often included for reducing odors, etc. present during decontamination may be eliminated from the process. Moreover, in systems using a chlorine (or other) additive, by-products, such as trihalomethanes, are often created from the additives that require disposal or further treatment, which can further increase overall costs. Furthermore, without the need to deal with by-products from such additives, the decontamination flow rate of the overall system may be increased, and the mixtures within the system may simply be recycled since no such by-products are present.

Figure 6:
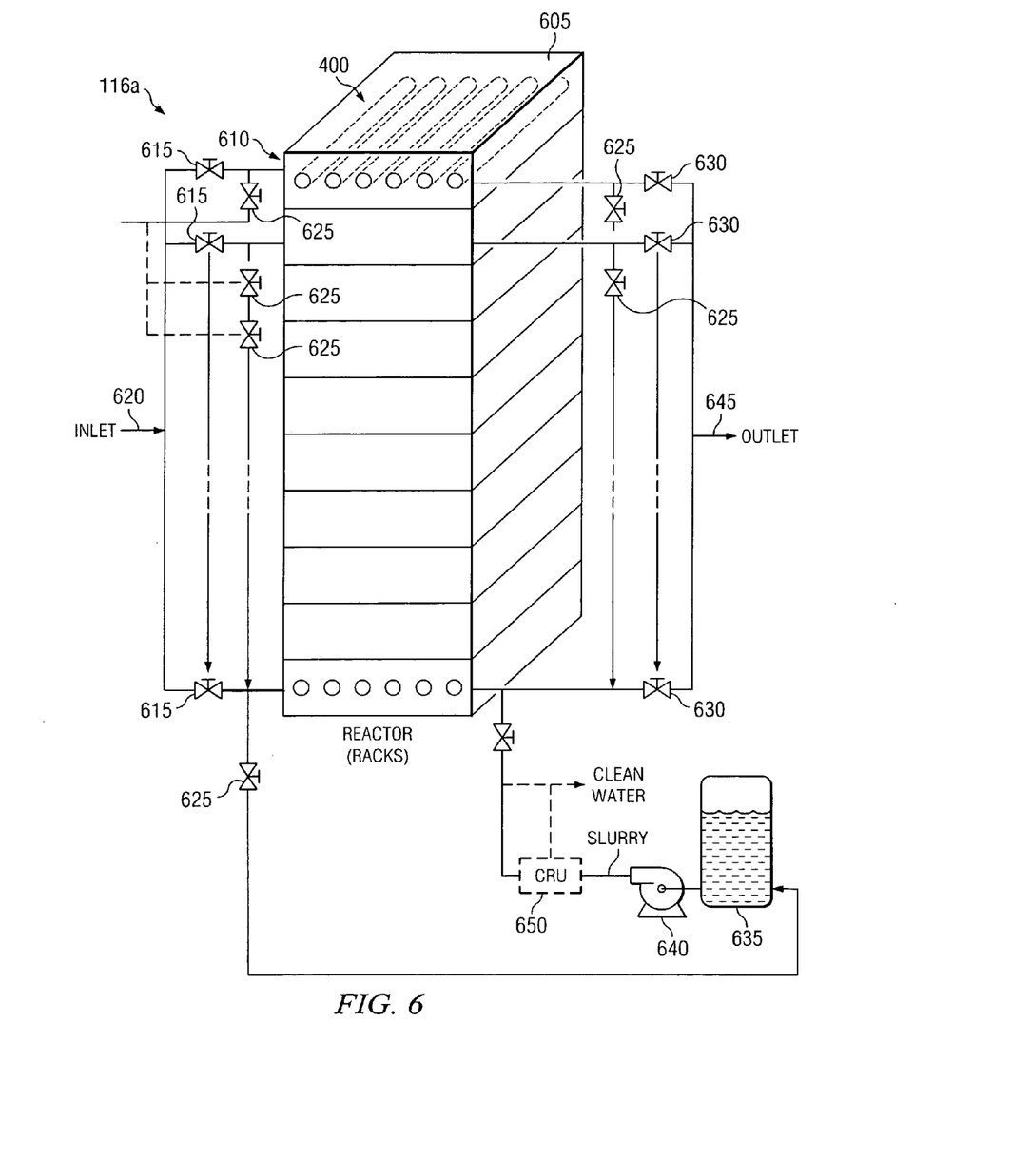
FIG. 6 illustrates an isometric view of one embodiment of the treatment system undergoing an off-line cleaning process in accordance with the principles disclosed herein.

Turning now to FIG. 6, illustrated is an isometric view of one embodiment of a photolytic treatment system 116a undergoing an off-line cleaning process in accordance with the principles disclosed herein. The photolytic treatment system 116a of the present invention may be embodied in the treatment system 116 illustrated and discussed with reference to FIG. 1. In this embodiment, the treatment system 116a includes a reactor 605 wherein the photolytic reactions described in detail above occur during a decontamination process. The reactor 605 is composed of a number of racks (one of which is labeled 610), with each rack containing multiple reactor cells 300, such as the kind described with reference to FIGS. 3, 4 and 5.

Coupled to each of the racks 610 is an isolation valve 615, and each of the isolation valves 615 are coupled to an inlet 620 for the contaminated fluid to enter and be decontaminated by the reactor 605 using a photolytic process. Each of the racks 610 also has a cleaning valve 625 coupled to its respective inlet for use during the cleaning technique disclosed herein. Furthermore, each of the racks 610 also includes a corresponding outlet valve 630 coupled to each respective rack outlet 645. With the isolation valves 615 and outlet valves 630, each of the racks 610 may be individually taken off-line by selectively isolating it from the incoming contaminated fluid.

Also illustrated in the system 116a is a storage tank 635. The storage tank 635 may be configured to hold a honing material having abrasive properties for use in cleaning the sleeves of the cells 300 in the reactor 605. In a specific embodiment, the honing material is a photocatalytic slurry, such $TiO_2$. The slurry may be pumped from the storage tank 635 during a cleaning process of the cells that is conducted in accordance with the principles disclosed herein. In other embodiments, the honing material may be the gas microbubbles discussed above, and the storage tank 635 may be a tank configured to store gas and/or include a compressor for use in pumping the gas into the fluid (i.e., aerating) before the fluid enters the reactor.

In this illustrated embodiment, the cleaning of the quartz sleeves in the cells 300 is accomplished in an "off-line" manner. More specifically, a select isolation valve 615 and outlet valve 630 are closed to isolate a particular rack 610 for cleaning the cells 300 therein. The slurry or other honing material (e.g., the hydrogen peroxide discussed above) is forced through the cells 300 and across the surface of the quartz sleeves in order to remove aggregated contaminants from the sleeve surface. More specifically, the abrasive honing material is pumped through the rack 610 at a high velocity such that turbulence will be maximized. In an exemplary embodiment, the velocity (e.g., linear velocity) of the slurry passing through the annulus during a cleaning process is about 1 m/sec. Although not limited to this particular flow rate/velocity, it has been discovered that a velocity of at least about 0.5 m/sec with respect to the outer surface of the quartz sleeve, when an annulus size of about 6 mm to 12 mm and a light source of about 75 watts is employed, is desired to efficiently clean aggregated contaminants therefrom. Of course, as the size of the annulus is optimized (see above), due to the effectiveness of the disclosed cleaning systems and methods, the size and power of equipment needed to provide a minimum flow rate/velocity of the honing material may also be decreased since there is less volume remaining in the annulus to move the material through.

When cleaning the selected rack 610, the honing material may be pumped through the rack 610 in either direction. In another embodiment, the honing material is pumped through the cells 300 using corresponding cleaning valves 625 while a photolytic purification process on the contaminated fluid is continued on the on-line racks 610, the difference being that the incoming contaminated media is isolated from the off-line rack 610 using the isolation valves 615. While the connections in the illustrated embodiment allow this approach, other embodiments may include other flow paths for the honing material to follow during a cleaning operation or the contaminated fluid to enter the reactor 605. In some embodiments, the honing material may be a photocatalyst. If the honing material is a photocatalyst, the time needed to clean the sleeves of aggregated contaminants will typically be shorter if the UV lamps in the sleeves are turned on because of the photocatalytic reaction of contaminated particles provided by the photocatalyst.

Moreover, the pH of a photocatalytic slurry having such a honing material may be altered to increase the rate of quartz sleeve cleaning by, for example, increasing the oxidation rate of the contaminants on the sleeve. More specifically, regardless of whether honing material is photo-reactive, the pH level of the honing material may be selected so as to decrease the pH level of the debris aggregated on the outer surface of the sleeve such that the debris is soluble in the contaminated fluid. In a specific example, if the debris aggregating on the sleeves is iron, the pH of the honing material, such as a photocatalytic slurry, may be lowered to about 3.5 or below. Since iron is water-soluble around a pH of 3.8 or below, lowering the pH of the honing material in this manner will lower the pH of the iron below its soluble point so that it is more easily removed from the sleeve. Then, the abrasion of the honing material combined with the lowered pH levels will more efficiently remove the iron from the sleeves than if the pH of the iron was left above its soluble level. If the honing material is in fact photo-reactive, as discussed further below, the use of UV light to increase oxidation of the debris may even further increase system efficiency. Of course, the pH levels may vary depending on the honing material and debris involved in each particular application.

In related embodiments, a honing material subjectable to photolytic reactions may also be employed (e.g., hydrogen peroxide), and the UV light source turned on to provide the photolytic reaction and thus also increase the rate of cleaning. However, even if the UV lamps are not turned on, the disclosed cleaning technique will still serve to clean the outer surfaces of the sleeves using the abrasive properties of the honing material, the size of the annulus, and the high-velocity at which the honing material is passed through the annulus and across the sleeve surfaces. In fact, almost any type of insoluble material having abrasive properties when pumped in a highly turbulent manner may be selected for the honing material. In some embodiments, the honing material is not photoreactive at all, as discussed above. More specifically, in such embodiments, the honing material may actually be the product being decontaminated by the system. As a result, the cleaning of the sleeves occurs during the normal operation of the equipment, rather than executing a distinct cleaning process by isolating certain racks. Of course, the time saved by eliminating specific cleaning cycles can help increase overall productivity.

In embodiments where the honing material includes a photocatalyst, after the sleeves in the cells 300 have been cleaned, the photocatalytic slurry mixture may be separated with a catalyst recovery unit (CRU 650, shown in broken line), and permeate (e.g., free of the photocatalyst) sent to the cells 300 to flush out all of the remaining photocatalytic honing material. The CRU 650 may then be used to separate the photocatalyst from the flushed slurry so that it may be recycled for use at a later time and so that none of the photocatalyst will be discharged when the rack 610 goes back on-line. When the photocatalyst is flushed out of all the cells 300 in the appropriate rack 610, then that rack 610 is brought back on-line and the next rack 610 in the reactor 605 is taken off-line and cleaned. Alternatively, of course, a CRU 650 is not required to collect the flushed slurry. Of course, even if a photocatalyst is not employed in the honing material, a CRU 650 may still be employed to separate any type of honing material, for example, a silica-based abrasive honing material, from the remaining fluid during the cleaning process. Specific examples of such a CRU may be found in the above-mentioned U.S. Pat. No. 5,462,674, as well as U.S. Pat. Nos. 5,589,078, 6,136,203, 6,398,971, and U.S. patent application Ser. No. 10/683,077 (filed Oct. 10, 2003), all of which are commonly assigned with the present disclosure and incorporated herein by reference for all purposes When such an off-line approach to cleaning the quartz sleeves is employed, an advantageous embodiment provides an extra rack 610 of cells 300 in the reactor 605 so that when one rack 610 is taken off-line for cleaning, the remaining racks 610 run the decontamination system at its desired capacity. For example, if a decontamination system employs ten racks 610 of cells 300 on-line at any time in order to meet the desired amount of decontamination, the reactor 605 may be constructed having eleven racks 610. Therefore, in such an embodiment, when one of the racks 610 is taken off-line for cleaning, there will still be the desired ten racks 610 running the photolytic decontamination process. Of course, any number of additional racks 610 may also be provided, depending on the application and the desired decontamination rate.

Figure 7:
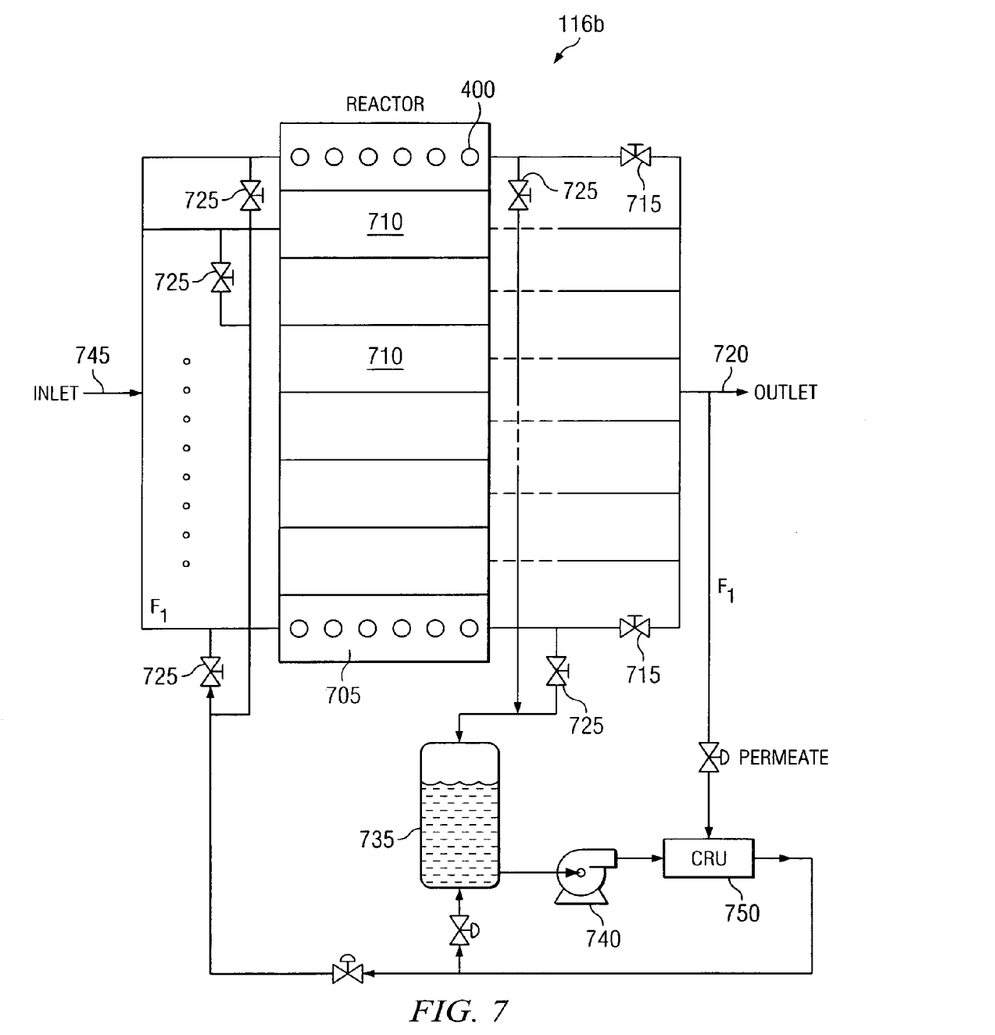
FIG. 7 illustrates a front view of another embodiment of the treatment system undergoing an on-line cleaning process in accordance with the principles disclosed herein.

Turning finally to FIG. 7, illustrated is a front view of another embodiment of a photolytic treatment system 116*b* undergoing an on-line cleaning process in accordance with the principles disclosed herein. Once again, the photolytic treatment system 116*b* may be embodied in the treatment system 116 of the conventional purification system 100 illustrated in FIG. 1. Also, the treatment system 116*b* again includes a reactor 705 wherein the photolytic reactions described in detail above occur during a decontamination process. The reactor 705 is composed of a number of racks (some of which are labeled 710), with each rack containing multiple reactor cells 300, such as the kind described with reference to FIGS. 3, 4 and 5.

Coupled to the output of each of the racks 710 is an isolation valve 715, and each of the isolation valves 715 are coupled to an outlet 720. Each of the racks 710 also has corresponding cleaning valves 725 coupled to its respective inlet and outlet for use during the cleaning technique disclosed herein. The cleaning valves 725 on the inlet side are parallel-coupled to a single inlet 745 for inputting contaminated fluid into the reactor 705, while cleaning valves 725 on the outlet side are parallel-coupled to a single outlet 720 for outputting decontaminated fluid. Also illustrated in the system 116*b* is a storage tank 735. The storage tank 735 is configured to hold the honing material used in the cleaning technique disclosed herein. The honing material may be pumped from the storage tank 735 during the reactor cells 300 with pump 740, as illustrated. As mentioned above, however, the honing material may also contain a photocatalyst to assist in cleaning the sleeves of the cells 300, but this is not required.

To perform the cleaning in one embodiment having the system 116*b* shown in FIG. 7, one rack 710 at a time may be operated in its normal photolytic purification and decontamination mode. Then, an inlet cleaning valve 725 for the selected rack 710 may be open so that the abrasive honing material may be added to that rack 710. In a more specific embodiment, the honing material is again a photocatalytic slurry. In such embodiments, the combination of the photocatalytic reaction and the abrasive properties seen at high slurry velocities clean the sleeves of the cells 300 in that rack 710. In this manner, the addition of extra racks 710 to compensate for those taken off-line for cleaning may be avoided. The effluent exiting the rack 710 being cleaned may then be sent to the holding tank 735, where it may then be pumped into a CRU 750 using pump 740 to recover the photocatalyst. Also as before, however, a honing material not containing photocatalytic materials may also be recovered and separated by the CRU 750.

Also, in such embodiments, the flow rate of the treated fluid and permeate is equal the flow rate through the rack 710 that is being cleaned. In this manner, a single isolation valve 715 on each of the effluent flow paths of the racks 710 may be employed. These valves 715 would normally be open, but then closed when the rack 710 is being cleaned. Then, after the rack 710 is cleaned, the slurry return valves (i.e., the cleaning valves 725) may be closed and the CRU 750 operated for a little longer until all of the photocatalyst (or standard honing material) is flushed out of the rack 710. The next rack 710 may then be cleaned in the same manner. An advantage of such embodiments is that the CRU 750 need only have a capacity substantially equal to the influent flow rate (F1) of the rack 710 being cleaned, thus decreasing overall costs associated with the system 116b. Alternatively, of course, a CRU 750 is not always required to collect the flushed slurry. Of course, as discussed above, if a honing material that is not photoreactive is employed, such as the actual product being decontaminated, no racks need to be taken off-line and the cleaning can occur while the system is functioning in its normal decontamination operation.

In still other embodiments, the systems and methods disclosed herein may also be employed to clean other types of materials, such as ceramic materials. For example, some decontamination systems use ceramic filtration for the removal of cryptosporidium or other filterable materials from contaminated media. Thus, the high velocity cleaning technique disclosed herein may be employed to oxidize/reduce and abrade inorganic materials from the ceramic material in an in-situ cleaning technique.

While various embodiments of systems and methods for in-situ cleaning of protective sleeves in UV decontamination systems have been described above, it should be understood that they have been presented by way of example only, and not limitation. Thus, the breadth and scope of the invention(s) should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

What is claimed is:

1. A system for decontaminating contaminated media, the system comprising:
   a translucent sleeve surrounding a light source and mounted within a cell of the system;
   a housing configured to receive the sleeve therein, a distance between an outer surface of the sleeve and an inner surface of the housing defining an annulus for flowing a contaminated fluid therein;
   a pump for continuously flowing contaminated fluid into the cell, through the annulus, and out of the cell; and
   a honing material in the contaminated fluid, the linear velocity of the honing material against the outer surface of the sleeve removing debris aggregated on the outer surface.

2. A system according to claim 1, wherein the pump flows the contaminated fluid through the annulus at a flow rate of about 1 meter per second or more when the annulus comprises about 6 mm to 12 mm.

3. A system according to claim 1, further comprising gas bubbles dispersed in the contaminated fluid.

4. A system according to claim 3, wherein the gas bubbles comprise oxygen that produce ozone and/or hydroxyl radicals when photo-reacting with light illuminating from the light source, the ozone and/or hydroxyl radicals oxidizing the contaminants in the contaminated fluid and the debris aggregated on the outer surface.

5. A system according to claim 1, wherein the honing material comprises photo-reactive components configured to photo-react with light illuminated from the light source to oxidize contaminants in the contaminated fluid and the debris aggregated on the outer surface.

6. A system according to claim 5, wherein the light is ultraviolet light.

7. A system according to claim 5, wherein the honing material comprises a photocatalytic slurry.

8. A system according to claim 7, wherein the photocatalytic slurry comprises $TiO_2$.

9. A system according to claim 1, wherein the contaminated fluid comprises dissolved oxygen that produces ozone and/or hydroxyl radicals when photo-reacting with light illuminating from the light source, the ozone and/or hydroxyl radicals oxidizing the contaminants in the contaminated fluid and the debris aggregated on the outer surface.

10. A system according to claim 1, wherein the honing material comprises product in the contaminated fluid to be oxidized by the system.

11. A system according to claim 10, wherein the product comprises starch.

12. A system according to claim 1, wherein the honing material comprises a pH selected such that the debris aggregated on the outer surface is soluble in the contaminated fluid.

13. A system according to claim 12, wherein the pH of the honing material is selected to be about 3.5 or lower when the soluble pH of the debris is about 3.8.

14. A system according to claim 1, wherein the sleeve is horizontally secured by only one of its ends, the system further comprising features dispersed on the outer surface and the inner surface and configured to substantially center the sleeve within the housing based on the flowing of the contaminated fluid through the annulus.

15. A system according to claim 14, wherein the features comprise protrusions.

16. A system according to claim 1, wherein a size of the annulus and a rate of the flowing of the contaminated fluid through the annulus creates a concentration of contaminants in the contaminated fluid so that a concentration of contaminants in the contaminated fluid is substantially equal within the contaminated fluid during the flowing of the contaminated fluid in the annulus.

17. A method for decontaminating contaminated media, the method comprising:
   mounting a translucent sleeve surrounding a light source within a cell;
   locating the sleeve within a housing, a distance between an outer surface of the sleeve and an inner surface of the housing defining an annulus for flowing a contaminated fluid therein;

dispersing a honing material within the contaminated fluid; and flowing contaminated fluid continuously into the cell, through the annulus, and out of the cell, the linear velocity of the honing material against the outer surface of the sleeve removing debris aggregated on the outer surface.

18. A method according to claim 17, further comprising flowing the contaminated fluid through the annulus at a flow rate of about 1 meter per second or more when the annulus comprises about 6 mm to 12 mm.

19. A method according to claim 17, wherein the method further comprises dispersing gas bubbles in the contaminated media.

20. A method according to claim 19, wherein the gas bubbles comprise oxygen that produce ozone and/or hydroxyl radicals when photo-reacting with light illuminating from the light source, the ozone and/or hydroxyl radicals oxidizing the contaminants in the contaminated fluid and the debris aggregated on the outer surface.

21. A method according to claim 17, wherein the honing material comprises photoreactive components, the method further comprising oxidizing contaminants in the contaminated fluid and the debris aggregated on the outer surface by illuminating light from the light source on the photoreactive components.

22. A method according to claim 21, further comprising illuminating with ultraviolet light.

23. A method according to claim 21, wherein the honing material comprises a photocatalytic slurry.

24. A method according to claim 23, wherein the photocatalytic slurry comprises $TiO_2$.

25. A method according to claim 17, wherein the contaminated fluid comprises dissolved oxygen that produces ozone and/or hydroxyl radicals when photo-reacting with light illuminating from the light source, the ozone and/or hydroxyl radicals oxidizing the contaminants in the contaminated fluid and the debris aggregated on the outer surface.

26. A method according to claim 17, wherein the honing material comprises product in the contaminated fluid to be oxidized by the system.

27. A method according to claim 26, wherein the product comprises starch.

28. A method according to claim 17, further comprising selecting a pH of the honing material such that the debris aggregated on the outer surface is soluble in the contaminated fluid.

29. A method according to claim 28, further comprising selecting the pH of the honing material to be about 3.5 or lower when the soluble pH of the debris is about 3.8.

30. A method according to claim 17, wherein locating the sleeve comprises horizontally securing the sleeve by only one of its ends, the method further comprising providing features on the outer surface and the inner surface and configured to substantially center the sleeve within the housing based on the flowing of the contaminated fluid through the annulus.

31. A method according to claim 30, wherein the features comprise protrusions.

32. A method according to claim 17, further comprising selecting a size of the annulus and a rate of the flowing of the contaminated fluid through the annulus so that a concentration of contaminants in the contaminated fluid is substantially equal within the contaminated fluid during the flowing of the contaminated fluid in the annulus.

* * * * *